A. BICKNELL.
Improvement in Sash Guide Blocks.
No. 4,809. Reissued March 19, 1872.
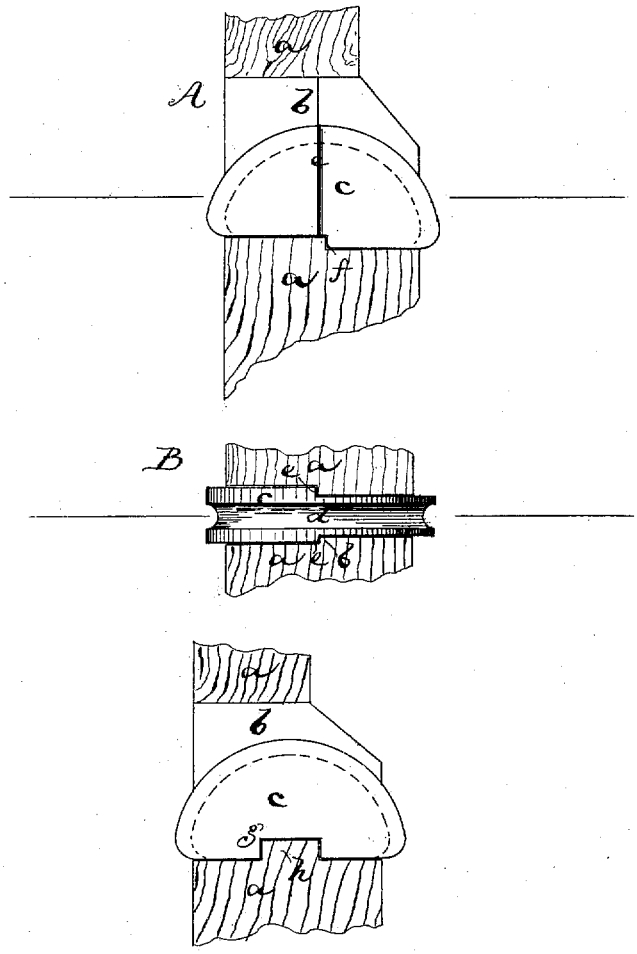
Witnesses.
Mo. W. Frothingham.
L. B. Hidden
Inventor.
Alfred Bicknell,
By his Attys.
Crosby & Gould
THE NORRIS PETERS CO., PHOTO-LITHO., WASHINGTON, D. C.

UNITED STATES PATENT OFFICE.

ALFRED BICKNELL, OF MALDEN, MASSACHUSETTS.

IMPROVEMENT IN SASH GUIDE-BLOCKS.

Specification forming part of Letters Patent No. 83,685, dated November 3, 1868; reissue No. 4,809, dated March 19, 1872.

*To all whom it may concern:*

Be it known that I, ALFRED BICKNELL, formerly of South Reading, now of Malden, in the county of Middlesex and State of Massachusetts, have invented a new and Improved Guide-Block for Window-Sash Cords; and I do hereby declare that the following is a full, clear, and exact description thereof, which will enable others skilled in the art to make and use the same, reference being had to the accompanying drawing forming part of this specification.

My invention relates to the manufacture of a substitute for the ordinary rotary pulleys, over which the cords of window-sashes are made to run, the object being to obtain a guide for the cord, which, while as effective as the ordinary roll or pulley, shall be more simple, cheap, and durable. For this purpose I use a stationary block, so formed as to be capable of insertion in a bore or mortise made for its reception in the stile of a window, and having in its upper surface a groove, which is semicircular from end to end, or approximately so, and is fitted in cross-section to receive the sash-cord and permit it to render freely through it. My invention consists primarily in a guide-block, having a longitudinally-curved semicircular groove for receiving a sash-cord, the block being formed for application to a window-stile, or with provision for such attachment to or connection with a window-stile as shall keep it in place. These blocks may be made of glass, porcelain, or other suitable material, but I prefer glass as being the cheapest and most effective.

The drawing represents a sash-cord block, embodying my invention. A shows the block in side elevation, and B is a top view of it, each view showing the block applied to a window-stile. C shows a block slightly modified in form from the block shown at A and B.

*a* denotes the sash-stile, made with a narrow mortise, *b*, formed of a width to receive the guide-block *c*. Said block may be variously shaped as to its outer surfaces, but is always made with the groove *d* extending over it, as seen in the drawing; this groove being of uniform size throughout its length, and fitted to receive the cord that connects the sash and its counterbalancing weight. The upper edge of the block may be shaped concentrically to the curve of the groove, as seen in the drawing, and its lower edge and side surfaces may be formed with shoulders *e f*, to fit against corresponding shoulders, made at the bottom and sides of the block-receiving mortise, such shoulders acting as stops to prevent displacement of the block, as will be readily understood. Instead of such shoulders the bottom of the block may be formed with a slot, *g*, fitting upon a tongue or projection, *h*, to keep the block in place; in either case the weight of the sash and counterbalancing weight acting in conjunction with the shoulders or projections to maintain the proper position of the block.

It will be observed that the opposite ends of the groove are so formed that the vertical sash-cord at each end will extend tangentially from the groove, so that there is no friction at the ends of the groove more than throughout its length; and as the surface of the groove is made very smooth, the friction of the sash-cord in slipping over the groove is very slight, being but little, if any, greater than the friction of a common sash-line in running over a common sash-pulley.

I claim—

1. A sash-cord guide-block, having a semicircular or curved cord-receiving groove, and means for securing the block in fixed position in the sash-stile.

2. A sash-cord guide-block, formed of glass or other vitreous or glazed material, substantially as described.

3. In combination with a sash or sash-stile, a stationary guide-block, having a semicircular cord-guiding groove, substantially as described.

ALFRED BICKNELL.

Witnesses:

FRANCIS GOULD,

M. W. FROTHINGHAM.